Dec. 23, 1969
J. J. SANDY, JR
3,485,541
TWO-DIRECTIONAL AXIAL THRUST BALANCER
Original Filed April 13, 1966
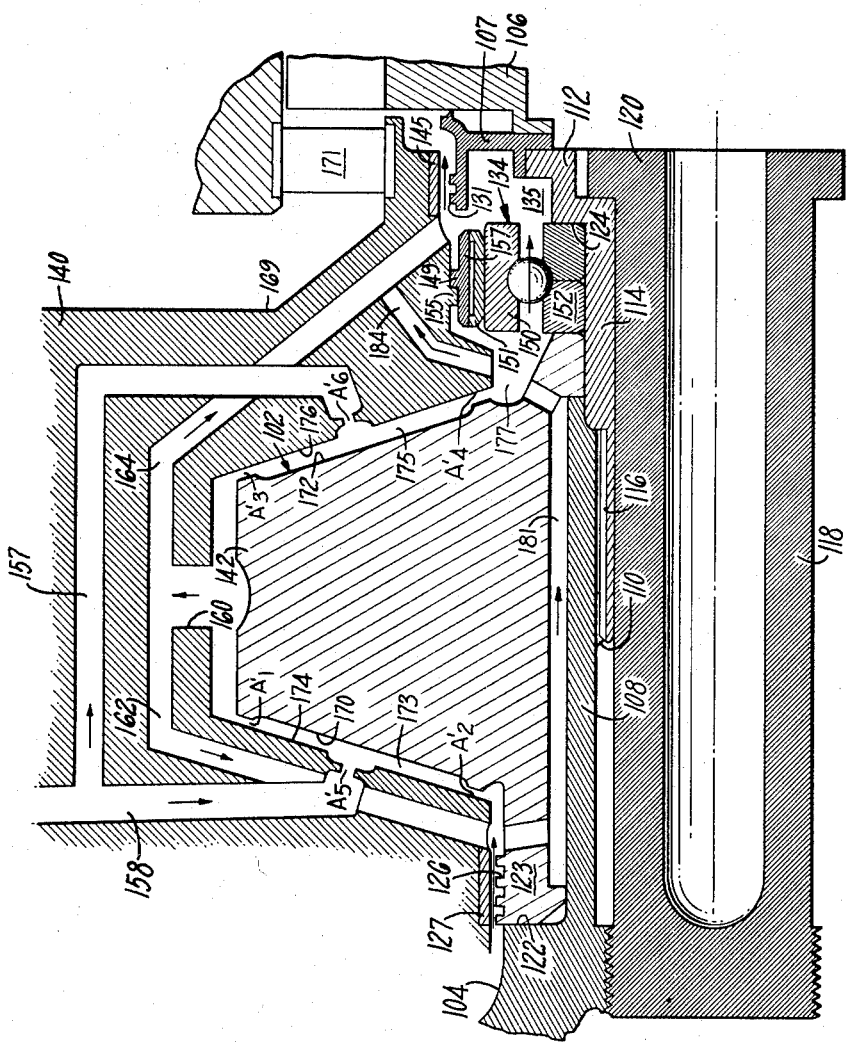
INVENTOR
JAMES J. SANDY JR
AGENT

3,485,541
TWO-DIRECTIONAL AXIAL THRUST BALANCER
James J. Sandy, Jr., Lake Park, Fla., assignor to United Aircraft Corporation, East Hartford, Conn., a corporation of Delaware
Original application Apr. 13, 1966, Ser. No. 542,386, now Patent No. 3,393,947, dated July 23, 1968. Divided and this application Dec. 28, 1967, Ser. No. 694,191
Int. Cl. F16c 17/08
U.S. Cl. 308—160                                      7 Claims

ABSTRACT OF THE DISCLOSURE

A two-directional axial thrust balancer for a shaft mounted in a housing wherein a thrust balancer is provided having a thrust balancing plate extending circumferentially from the shaft and being positioned in a mating groove or recess in the housing. The faces of the sides of the plate each forming a chamber on each side of the plate with its cooperating face in the recess in the housing. Projection means being provided adjacent the base of said plate means around the shaft and adjacent its outer end to form variable restriction means as the plate moves axially. Pressure inlet means being provided having a fixed inlet into said chambers between said projection means.

CROSS-REFERENCES TO RELATED APPLICATIONS

This application is a division of U.S. Patent No. 3,393,947.

BACKGROUND OF THE INVENTION

While thrust balancers are known in the art, none could be found having the configuration as shown in this application.

SUMMARY OF INVENTION

This invention relates to a fluid thrust balancing system which will balance thrust forces on a shaft to maintain said shaft in a desired axial position. This thrust balancer requires only a low flow of operating fluid for satisfactory operation. This invention calls for a thrust balancing plate fixed around the outer circumference of a shaft being positioned in an annular recess in a housing located around the opening in which said shaft is mounted for rotation. A fixed area inlet means is positioned to direct a fluid under pressure to a point between each face of said plate member and its mating face of said housing. Projection means to act as a variable area outlet are located adjacent the inner edge of said plate and adjacent the outer edge to form a chamber therebetween which receives the fluid from said inlet.

BRIEF DESCRIPTION OF THE DRAWING

The figure is a schematic view showing a thrust balancing system mounted between a shaft and housing wherein the plate is fixed to the shaft.

DESCRIPTION OF THE PREFERRED EMBODIMENT

As viewed in the figure, a thrust balancing system 102 is located between a pump impeller 104 having blades and turbine blades 106. The pump impeller 104 includes a hollow shaft section 108 which extends outwardly therefrom and has an open end with internal splines 110. The turbine blades 106 have their roots fixed to an annular seal member 107 which is, in turn, fixed to a flange 112 which has a hollow shaft section 114 extending therefrom having external splines 116 which engages splines 110 of shaft section 108. A tie bolt 118 having an enlarged head 120 which engages the bottom of a recess in the outer surface of the flange 112 of the shaft section 114 extends through shaft sections 114 and 108 to threadably engage the shaft section 108. This holds the two shaft sections together.

Located on the two shaft sections between an abutting face 122 on shaft section 108 and an abutting face 124 on the outwardly extending flange 112 are in order, (1) an annular thrust balancing plate or piston 142, the forward part of the plate has a sleeve projection 123 which has a four-lip labyrinth straight through seal 127 located thereon and the rearward part of the plate has a section of reduced diameter which engages shaft section 114, and (2) the two-part inner race 152 of a bearing unit 134.

Housing means 140 extends over the pump, turbine and thrust balancing system. The housing also provides an inlet 169 to the turbine blades 106 with stators 171 being positioned to direct flow into said blades. An insert member 127 is supported by housing 140 for engagement with the four lips of the seal 126. At this point between the housing 140 and pump impeller 104, a pressure is introduced which will prevent a leak from within the balancer. This can be connected to some interstage pump pressure. Housing 140 also supports the outer race 150 of the bearing unit 134 by an annular U-shaped member 151 which contacts said outer race and permits its movement when necessary, and an annular flat member 155 which contacts the outwardly extending arms of the U-shaped member 151. Member 155 is provided with an annular stop 149 which engages a stop 159 on the housing. When positioned in the housing, the two members 151 and 155 are fixed relative to each other and to the housing. The annular seal member 107 affixed to the flange 112 has a two-lip labyrinth straight through seal 131 while the housing 140 supports an insert member 145 which mates with the two lips of seal 131. This seal permits flow from the thrust balancing system to vent.

The thrust balancing plate 142 has two side faces 170 and 172 with an annular projection circumferentially encircling the outer end of each face, and an annular projection circumferentially encircling the inner end of each face. Housing means 140 has an annular face 174 located parallel to and spaced from face 170 and an annular face 176 located parallel to and spaced from face 172. The faces 170 and 174 form an annular chamber 173 with the cooperating projections of face 170, and the faces 172 and 176 form an annular chamber 175 with the cooperating projections of face 172. These projections are arranged to mate with a cooperating face 174 or 176 on the housing 140 with each pair of projections acting as a variable area outlet when the thrust balance plate or piston is moved axially with respect to the housing. The variable area outlets for chamber 173 are designated $A'_1$ and $A'_2$ and the like outlets for chamber 175 are designated $A'_3$ and $A'_4$, respectively.

Conduit means 157 and 158 direct an operating fluid to fixed inlet openings $A'_5$ and $A'_6$ which in turn direct the fluid into the chambers 173 and 175, respectively. A plurality of these openings $A'_5$ and $A'_6$ are located around each face 174, 176 of said housing positioned adjacent the faces 170 and 172, respectively, of the plate 142.

Operating fluid from the operating chambers 173, 175 passes out the outer edge of the space in which the balance plate is located, by a conduit 160 which is, in turn, connected to two conduits 162 and 164. Conduit 162 is connected to a point adjacent the sleeve projection 123 and the other conduit 164 is connected to the space 135 between bearing 134 and seal 107.

Passageways 181 are located in the base of the thrust balance plate to direct fluid in the thrust balance system from the pump side adjacent the sleeve projection 123 to the chamber 177 on the turbine side which is, in turn, connected to bearing 134 and passageway 184. From chamber 177 fluid passes through the bearing 134 and passageway 184 to the chamber 135. The chamber 135 is connected to vent through the seal 131. When plate or piston 142 is positioned equidistant between faces 174 and 176 then $A'_1+A'_2=A'_3+A'_4$ and the volume of chamber 173 equals the volume of chamber 175. As the thrust balancing plate 142 moves axially to the left, $A'_1$ and $A'_2$ approach zero and $A'_3$ and $A'_4$ approach a maximum. When the thrust balance plate moves in the opposite direction, $A'_3$ and $A'_4$ approach zero and $A'_1$ and $A'_2$ approach a maximum. Here again, the openings $A'_5$ and $A'_6$ remain fixed during axial movement of plate 142.

In a thrust balancing system constructed in accordance with the figure, the axial distance between the faces 170 and 172 and the faces 174 and 176, respectively, was .010" and there were sixteen inlet openings $A'_5$ and $A'_6$. The outer projections forming the outlet openings $A'_1$ and $A'_3$ were located 3.33" from the center line and the inner projections forming the outlet openings $A'_2$ and $A'_4$ were located 1.88" from the center line. In this construction, the area of each outlet, at a small portion of the plate, $A'_1+A'_2$ and $A'_3+A'_4$, was made twice the size of the area of each inlet $A'_5$ and $A'_6$.

OPERATION

As can be seen from this description when an unbalance force moves the shaft to the left as viewed in the figure, the area of the outlets $A'_1+A'_2$ closes and the area of $A'_3+A'_4$ opens causing the pressures in the volumes of chamber 173 and of chamber 175 to approach 4500 p.s.i. and 50 p.s.i., respectively. This difference in pressure across plate 142 results in a counterbalancing force to the right that restores the shaft to its original position. Conversely, when a force is applied to the right, a restoring force would be created in the opposite direction to again reposition said shaft.

It is to be understood that the invention is not limited to the specific description above or to specific figures shown, but may be used in other ways without departure from its spirit as defined by the following claims.

I claim:

1. In combination, a housing, shaft means mounted for rotation in said housing, said shaft means having plate means extending therefrom outwardly, said housing having a recess therein for receiving said plate means, said plate means having a first annular thrust balance face on each side thereof, said recess being formed having a cooperating second annular thrust balance face adjacent each first thrust balance face, annular projection means extending from a point adjacent the outer edge of each first thrust balance face and from a point adjacent the inner edge of each face near the shaft means, said projection means being formed to meet with the cooperating second thrust balance face to form spaced variable exit openings therewith having a chamber therebetween, means for directing a fluid into each chamber, said shaft means comprising a necked-down portion and said plate means comprising an annular member having an opening through the center thereof, said necked-down portion of said shaft means extending through said opening and having bolt means for fixing said plate means to said shaft means.

2. In combination, a housing, shaft means mounted for rotation in said housing, said shaft means having plate means extending therefrom outwardly, said housing having a recess therein for receiving said plate means, said plate means having a first annular thrust balance face on each side thereof, said recess being formed having a cooperating second annular thrust balance face adjacent each first thrust balance face, annular projection means extending from a point adjacent the outer edge of each first thrust balance face and from a point adjacent the inner edge of each face near the shaft means, said projection means being formed to meet with the cooperating second thrust balance face to form spaced variable exit openings therewith having a chamber therebetween, means for directing a fluid into each chamber, seal means being located between said shaft means and housing on each side of said plate means, first passage means connecting one side of said plate means to the other, said first passage means having one end connected to a first chamber located between one variable exit opening and one of said seal means and the other end connected to a second chamber located between the other variable exit opening and the other cooperating seal means, and second passage means connecting the top of said recess with each of said first and second chambers.

3. In combination, a housing, shaft means mounted for rotation in said housing, said shaft means having plate means extending therefrom outwardly, said housing having a recess therein for receiving said plate means, said plate means having a first annular thrust balance face on each side thereof and a second end cylindrical surface, said recess being formed having a cooperating third annular thrust balance face adjacent each first thrust balance face and a cooperating fourth end surface spaced from and surrounding said second end cylindrical surface, first annular projection means extending from a point adjacent the outer edge of each first thrust balance face, second annular projection means extending from a point adjacent the inner edge of each first thrust balance face adjacent the shaft means, each of said first annular projection means being formed to meet with its cooperating third thrust balance face to form first spaced variable exit openings, each of said second annular projection means being formed to meet with its cooperating third thrust balance face to form second spaced variable exit openings, a chamber being formed between each first and second spaced variable exit openings, means for directing a fluid into each chamber, said second end cylindrical surface forming an annular space with said fourth end surface, said first spaced variable exit openings exiting into said annular space, first passage means for directing fluid from said first spaced variable exit openings away from the space between said second end cylindrical surface and said fourth end surface, and second passage means for directing fluid away from said second variable exit openings.

4. A combination as set forth in claim 3 wherein said second passage means includes a passage between one side of the plate means and the other.

5. A combination as set forth in claim 3 wherein said plate means includes a plate having a cross section which tapers inwardly as it extends outwardly.

6. A combination as set forth in claim 3 wherein said means for directing a fluid into each chamber comprises a plurality of fixed inlet openings located around the chamber on a circular line which is located approximately half way between the first and second spaced variable exit openings.

7. A combination as set forth in claim 6 wherein the area of each pair of first and second spaced variable exit openings is twice the size of the area of the cooperating fixed inlet openings.

References Cited

UNITED STATES PATENTS

| 2,578,711 | 12/1951 | Martellotti | 308—122 |
| 3,132,903 | 5/1964 | Webb | 308—170 |
| 3,353,877 | 11/1967 | Lindeboom | 308—170 |

FOREIGN PATENTS

| 769,152 | 6/1934 | France. |

MARTIN P. SCHWADRON, Primary Examiner

F. SUSKO, Assistant Examiner